United States Patent [19]

Schreiber

[11] Patent Number: 5,200,452

[45] Date of Patent: Apr. 6, 1993

[54] FIRE RETARDANT CURABLE 1-OXA-3-AZA TETRALINE (ALSO TERMED "3,4-DIHYDRO-1,3-BENZOXAZINE") DERIVED RESIN COMPOSITION

[75] Inventor: Herbert Schreiber, Wollerau, Switzerland

[73] Assignee: Gurit-Essex AG, Freienbach, Switzerland

[21] Appl. No.: 793,817

[22] Filed: Nov. 18, 1991

[30] Foreign Application Priority Data

Dec. 21, 1990 [CH] Switzerland ................. 4106/90

[51] Int. Cl.$^5$ ............................................. C08J 3/20
[52] U.S. Cl. .................................... 524/398; 524/88; 524/176; 524/177; 524/399; 528/210; 528/417
[58] Field of Search ............... 524/176, 177, 398, 399, 524/88; 528/210, 417

[56] References Cited

U.S. PATENT DOCUMENTS 3,655,606 4/1972 Lucas ..................... 524/398
4,812,501 3/1989 Odorisio et al. .......... 524/398

Primary Examiner—Paul R. Michl
Assistant Examiner—Sid Kalachandra
Attorney, Agent, or Firm—Tarolli, Sundheim & Covell

[57] ABSTRACT

Difficultly inflammable polymeric resins are obtained by curing resin mixtures comprising
(a) a resin component comprising at least one thermically curable 1-oxa-3-aza tetraline groups containing compound; and
(b) an organic metal or semimetal compound, or a carbon monoxide complex compound, of an element of the 6th, 7th or 8th auxiliary group of the periodic system or of copper, antimony or bismuth.

65 Claims, No Drawings 5,200,452

FIRE RETARDANT CURABLE 1-OXA-3-AZA TETRALINE (ALSO TERMED "3,4-DIHYDRO-1,3-BENZOXAZINE") DERIVED RESIN COMPOSITION

TECHNICAL FIELD

This invention relates to resin mixtures which may be cured to form polymeric resins which are difficultly inflammable; to processes for preparing such polymeric resins; to processes for manufacturing plastic products which are difficultly inflammable; as well as to intermediate products for manufacturing such plastic products. More particularly, this invention relates to resin mixtures of 1-oxa-3-aza tetraline group containing compounds and flame retardants, and to polymeric resins obtained by curing such mixtures.

BACKGROUND OF THE INVENTION

All self-extinguishing resins which are so far used or described show essential disadvantages. Halogen-containing resins are self-extinguishing but when burning, they develop highly toxic and corrosive flue gases, or they even split off toxic compounds during their preparation. The use of other flame retardants did not so far give satisfactory results neither. Either they are to be used in such important amounts that their properties are impaired or the workability is endangered. In some cases the obtained resins are thermically unstable, or they are water-sensitive, or they are toxically doubtful, or they show other disadvantages. On the other hand, plastics which are less combustible and therefor are requiring lower amounts of additives, such as for example phenol formaldehyde resins, originally show many disadvantages, such as for example poorer mechanical and electrical properties. During curing, these duroplastic resins split off volatile products and therefor are not suitable for many processing methods. Finally, there are some high-tailored plastics which in view of their difficult manufacturing are not suitable for a more general use just for commercial reasons.

Despite very intense efforts, it did not succeed so far to develop a difficultly inflammable, toxically undoubtful polymeric resin which meets all other properties requirements, workability and economy, and which could replace halogen-containing systems.

OBJECTS OF THE INVENTION

It is a primary object of the present invention to provide resin mixtures and polymeric resins which avoid the abovementioned disadvantages of the prior art.

It is a further object of the invention to provide such polymeric resins which are resistant to higher temperatures than those of the prior art.

It is a still further object of the invention to provide such resin mixtures and polymeric resins which can be produced at a lower price.

SUMMARY OF THE INVENTION

To meet these and other objects, the present invention provides a resin mixture which may be cured to form a polymeric resin which is difficultly inflammable, said resin mixture comprising:
(a) a resin component comprising at least one thermically curable 1-oxa-3-aza tetraline groups containing compound; and
(b) a compound selected from the group consisting of:
organic compounds of an element of the 6th auxiliary group of the periodic system;
carbon monoxide complex compounds of an element of the 6th auxiliary group of the periodic system;
organic compounds of an element of the 7th auxiliary group of the periodic system;
carbon monoxide complex compounds of an element of the 7th auxiliary group of the periodic system;
organic compounds of an element of the 8th auxiliary group of the periodic system;
carbon monoxide complex compounds of an element of the 8th auxiliary group of the periodic system;
organic compounds of copper;
carbon monoxide complex compounds of copper;
organic compounds of antimony;
carbon monoxide complex compounds of antimony;
organic compounds of bismuth; and
carbon monoxide complex compounds of bismuth.

DESCRIPTION OF THE PREFERRED EMBODIMENTS

Compounds containing 1-oxa-3-aza tetraline groups and their prepolymers (hereafter jointly called "oxazene resins" by convenience) are known, for example from the publications CH-A5-574,978, CH-A5-579,113 and CH-A5-606,169. They are obtained, for example, from phenols by reaction with formaldehyde and an amine, approximately according to formula (A):

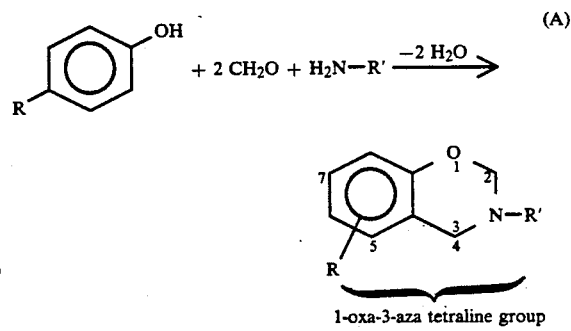

For example, R is hydrogen, halogen, alkyl or alkoxy, and R' is an aliphatic or aromatic group.

However, the compounds containing 1-oxa-3-aza tetraline groups of component (a) can also be prepared by other methods resulting into similar products.

In contrast to other known condensation reactions of phenols, amines and formaldehyde, in the reaction outlined above phenolic OH-groups are consumed. It is thereby possible, according to the formula (A) hereinabove, to determine the amount of the synthesized 1-oxa-3-aza tetraline groups from the analytic determination of the said OH-groups in the reaction mixture.

Prepolymers of 1-oxa-3-aza tetraline groups containing compounds are also useful for preparing said oxazene resins. Since some of the 1-oxa-3-aza tetraline groups may react during polymerization, these prepolymers may contain a smaller number of said 1-oxa-3-aza tetraline groups than provided by the monomers used to form such prepolymers. However, it is essential that the intermediately formed or hypothetic monomer reaction product does in fact contain 1-oxa-3-aza tetraline groups. This can easily be calculated by a person skilled in the art from the functionality. An 1-oxa-3-aza tetraline compound, or its prepolymer, useful in accordance with the present invention is, for example, formed if the molar ratio is kept within the limits defined in the abovementioned publication CH-A5-606,169.

Phenol or phenol derivatives as well as amines and formaldehyde are used as starting or basic materials for preparing the 1-oxa-3-aza tetraline compound.

Preferably, for the present invention, 1-oxa-3-aza tetraline groups containing compounds are used which are formally derived from a phenol and an amine, one of said components being more than monofunctional.

Examples of phenols which can be used are:

Monovalent phenols, such as phenol, m- and p-cresol, m- and p-ethyl phenol, m- and p-isopropyl phenol, m- and p-isopropyloxy phenol, m- and p-chloro phenol, and beta-naphthol. Meta-substituted phenols are preferred, since they do not include any blocked reactive positions.

Bivalent phenols, such as 4,4'-dihydroxydiphenyl methane, 2,4'-dihydroxydiphenyl methane, 3,3'-dihydroxydiphenyl methane, 2,2'-bis-(4-hydroxyphenyl) propane, 4,4'-dihydroxy stilbene, hydroquinone, pyrocatechol, and resorcin.

Low-condensed phenol formaldehyde novolak resins, eventually mixed with phenol.

Examples of amines which are particularly useful are:

Aniline, o-, m- and p-phenylene diamine, benzidine, 4,4'-diaminodiphenyl methane, 2,2'-bis-(aminophenyl) propane, cyclohexylamine, ethylenediamine and propylenediamine.

Particularly useful are such phenols and amines which do contain no or only little aliphatic entities, thus predominantly or exclusively comprising aromatic groups. For the abovementioned toxicological reasons, halogenated derivatives are avoided, if possible, despite the fact that they would give extremely difficultly inflammable polymeric resins. It is just a specific advantage of the present invention that halogenated compounds can be avoided. Particularly useful are, on the one hand, phenol, dihydroxydiphenyl methanes, dihydroxybenzenes and novolaks, and, on the other hand, aniline, phenylene diamines and diaminodiphenyl methane.

The compounds stated above as being useful as component (b) may be summarized as being organic metal or semimetal compounds or carbon monoxide complex compounds of the elements of the 6th, 7th or 8th auxiliary group of the periodic system, or of copper, antimony or bismuth. Organic compounds of copper, manganese, chromium, iron and antimony are particularly useful.

Preferably, said component (b) is a compound comprising bondings between said element and at least one carbon atom, such as bondings with alkyl, aryl, aralkyl, alkenyl and alkinyl compounds; enolates, such as acetylacetonate; as well as ethyl acetoacetate.

Also useful are compounds comprising bondings between said elements and at least one nitrogen or phosphorous atom, particularly complex compounds, such as porphins, porphyrins and phthalocyanines.

The best flame retardant effect is produced by complex compounds of said elements with cyclic conjugated polyenes or with polyenyl groups having nonlocalized electron pairs, particularly complex compounds of said elements with cyclopentadienyl compounds; with cyclopentadienyl compounds having substituted cyclopentadienyl groups; with cyclopentadienyl compounds the cyclopentadienyl groups of which are partially replaced by other complex forming groups; and with cyclopentadienyl compounds the cyclopentadienyl groups of which are partially replaced by carbon monoxide. The most preferred compound is ferrocene.

Ferrocene [bis(eta-cyclopentadienyl)iron] is described in literature as a smoke diminisher for such plastics which, per se, are difficultly inflammable, such as polyvinyl chloride. This effect is based on the action of ferrocene as an oxidation catalyst. Thus, it is also used as a combustion booster in fuels. Therefore, a person skilled in the art could not expect that ferrocene is acting as flame retardant in the systems according to the present invention. As a matter of fact, with a too high dosing, the reverse, expected effect of combustion boosting is provoked. In this case, even after the extinction of the flame, a long afterglow takes place. Also, in other resins, such as for example epoxy resins, ferrocene does not act as a flame retardant.

The polymeric resins according to the present invention are not only difficultly inflammable but also are resistant to high temperatures of from more than 200° C. to more than 300° C., and they show very good electrical and mechanical properties. It is particularly surprising that even after a long tempering the flame retardant effect of ferrocene does not fail, despite its high volatility.

The flame retardant properties are particularly marked with plastics comprising reinforcing such fibers and/or fillers which are difficultly or not at all inflammable. Particularly effective are additives which endothermally decompose at higher temperatures, such as magnesium hydroxide; aluminium hydroxide [Al(OH)$_3$]; calcium, magnesium and barium carbonate and their mixed salts; as well as mixtures of these compounds.

Particularly useful as reinforcing fibers are glass fibers, quartz fibers, carbon fibers, mineral fibers, and difficultly combustible synthetic fibers, in all their usual forms, such as short fibers, staple fibers, filaments, threads, fabrics, cloths; and non-wovens.

The difficultly inflammable polymeric resins according to the invention, which—as said above—are also resistant to high temperatures, are obtained by curing said resin mixtures, particularly at temperatures from 80° to 300° C., and preferably from 130° to 220° C.

The properties of the polymeric resins produced as described above can be tailored for certain applications by addition of usual additives. The following additives are of particular importance:

plasticizers, especially phosphorous compounds;
carbon black or graphite;
dyestuffs;
micro hollow spheres;
metal powder; and
additional flame retardants, such as for example elemental red phosphorous; oxygen acids of phosphorous and their inorganic and organic salts; and boric acid and its salts.

Moreover, the polymeric resins according to the invention may comprise other polymeric resins. Of particular interest are modifications with epoxy resins or phenolic resin novolaks. It was particularly surprising that even modifications with cycloaliphatic epoxy resins, which are much more easily inflammable, become noncombustible upon combining them with the resin mixtures according to the present invention. On the other hand, just these modifications are of particular interest, since they show extremely high glass transition temperatures (also called "glass temperatures").

The methods known for processing thermically curable phenol formaldehyde resins, for example epoxy resins, such as hot-pressing of prepregs or SMCs (Sheet Molding Compounds); molding or injection molding of molding compounds; casting; filament winding; or vacuum impregnating, may be used for processing the resins according to the invention.

Difficultly inflammable objects made from the polymeric resins according to the invention are useful in most various ranges of application, such as for example: as structural members of buildings, furniture, machines or vehicles; as housings of electric appliances; or as basic material of printed circuit boards. Reinforced and non-reinforced, filled and non-filled polymeric resins, as well as foamed plastic and adhesives may be used for said purposes.

EXAMPLES

The following starting materials and materials are used in the following examples:

Oxazene resin No. 1:
Prepared by reacting 4,4'-diamino-diphenylmethane with phenol and formaldehyde in a molar ratio of 1:2:4.

Oxazene resin No. 2:
Prepared by reacting aniline with dihydroxydiphenyl methane [bisphenol F] and formaldehyde in a molar ratio of 2:1:4.

Oxazene resin No. 3:
Prepared by reacting p-diamino benzene with phenol and formaldehyde in a molar ratio of 1:2:4.

Oxazene resin No. 4:
Prepared by reacting aniline with a trifunctional novolak and formaldehyde in an equivalent ratio $NH_2 OH : CH_2OH = 1:1:2$.

Oxazene resin No. 5:
Prepared by reacting aniline with a trifunctional novolak and formaldehyde in an equivalent ratio $NH_2 OH : CH_2OH = 1:0.8:1.6$.

Epoxy compound No. 1:
Liquid bisphenol A glyoidyl ether: epoxy equivalent weight: 200 (trade name "Epikote 828").

Epoxy compound No. 2:
3,4-Epoxy-cyclohexylmethyl-3,4-epoxy-cyclohexane carboxylate (trade name "Araldit CY 179").

Aluminium hydroxide (aluminium oxide trihydrate = ATH)
$Al(OH)_3$; mean particle size: 0.0008 mm.

Glass cloth No. 1:
Surface density: 290 g/m²; number of threads/cm: 7×7; epoxy silane finish.

Glass cloth No. 2:
Surface density: 110 g/m²; number of threads/cm: 24×24; epoxy silane finish.

For the preparation of test plates, the resin mixtures were cured between two glass plates for 2 hours at 200° C. For the samples containing glass cloth, the glass cloth was first impregnated with the resin mixture under vacuum at 120° C. and thereafter cured between the glass plates.

The flame-resistance test was made according to UL Specification 94 (Vertical Test), abreviated: "UL 94" (cf.: Jürgen Troitzsch, Brandverhalten von Kunststoffen [1982 Munich/Vienna - ISBN 3-446-13391-7], pages 396 to 399). The glass transition temperature was determined calorimetrically by the DSC method ("Differential Scanning Calorimetry").

EXAMPLES 1 TO 17

The resin mixtures were added with ferrocene. The compositions and the results of the flame-resistance tests are compiled in Table 1. All samples were cured for 2 hours at 200° C.

The following properties were determined on the laminate of Example 3:

| Specific volume resistance: | | |
|---|---|---|
| after curing | $3 \cdot 10^{16}$ | ohms · cm |
| after dump storing | $1.5 \cdot 10^{14}$ | ohms · cm |
| Specific surface resistance: | | |
| after curing | $1.3 \cdot 10^{15}$ | ohms · cm |
| after dump storing | $6.5 \cdot 10^{11}$ | ohms · cm |
| Breakdown resistance | 31 kV/mm. | |

The laminate of Example 4 had a glass transition temperature of 170° C., which after tempering the sample for 24 hours at 220° C. had increased to 197° C. The duration of combustion of the tempered sample was about 5 sec and corresponded to class UL 94-V0. The bending test showed the following results:

| | Before tempering | After tempering |
|---|---|---|
| Breaking strength | 466 N/mm² | 460 N/mm² |
| Elongation of edge fibers | 2.7% | 2.6% |
| Modulus of elasticity | 21.5 kN/mm² | 19.3 kN/mm² |

In Examples 15 and 16, the resin mixtures were first dissolved in benzene. Thereafter, the glass cloth was impregnated with the solution and dried. The obtained prepreg was pressed to a laminate in a hot-press and cured for 1 hour at 220° C. In Example 15, the oxazen resin No. 4 was prepolymerized by heating it for 3 hours to 130° C.

EXAMPLES 18 TO 22

These examples were carried through with oxazene resin No. 1 and 2 %, each, of the metal compounds. Laminates comprising 10 layers of glass cloth No. 2 were prepared as described above. The testing results are compiled in Table 2.

EXAMPLE 23

A mixture of oxazene resin No. 1 with 2 percent by weight of clyclopentadienyl-tricarbonyl-molybdenum-dimer was cured in an open bowl for 1 hour at 200° C. A slightly foamed plate of a density of 0.22 g/cm³ was obtained. The sample, which had a thickness of 7 mm, showed in the flame-resistance test a duration of 15 sec, corresponding to class UL 94-V1.

TABLE 1

| | | | Example No. | | | | | | | | | | | | | | | | |
|---|---|---|---|---|---|---|---|---|---|---|---|---|---|---|---|---|---|---|---|
| | CT1[1)] | CT2[2)] | 1 | 2 | 3 | 4 | 5 | 6 | 7 | 8 | 9 | 10 | 11 | 12 | 13 | 14 | 15 | 16 | 17 |
| Composition | | | | | | | | | | | | | | | | | | | |
| Ferrocene [%] | — | — | 0.5 | 1 | 2 | 2 | 5 | 5 | 2 | 2 | 2 | 1 | 1 | 1 | 2 | 1 | 2 | 2 | 2 |
| Oxazen resin No. | 1 | 1 | 1 | 1 | 1 | 1 | 1 | 2 | 1 | 1 | 1 | 1 | 1 | 1 | 3 | 4 | 5 | 1 |
| Oxazen resin [%] | 100 | 70 | 99.5 | 99 | 98 | 98 | 95 | 95 | 48 | 78 | 88 | 89 | 79 | 79 | 38 | 79 | 78 | 78 | 38 |

TABLE 1-continued

| | CT1[1] | CT2[2] | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|---|
| Epoxy resin No. | | 1 | — | — | — | | | | | | | | | | 2 | | | | 1 |
| Epoxy resin [%] | — | 30 | — | — | — | | | | | | | | | | 30 | | | | 30 |
| ATH [%] | | | — | — | — | | | 20 | 10 | 10 | 20 | 20 | 30 | 20 | 20 | 20 | 30 |
| Quartz powder [%] | | | — | — | — | | 50 | | | | | | | | | | | | |
| Layers glass cloth No. 1 | | | — | — | — | | | | | | | | | 3 | 1 | 4 | 1 | | |
| Layers glass cloth No. 2 | 10 | 10 | 9 | 9 | 10 | 9 | 9 | 10 | | | | | | | | | 9 | 9 | 10 |
| Flame-resistance test UL 94 | | | | | | | | | | | | | | | | | | | |
| Thickness [mm] | 1.2 | 1.2 | 0.8 | 1 | 1.2 | 0.9 | 0.9 | 1.2 | 1.2 | 1.9 | 1.8 | 1.9 | 1 | 0.13 | 1.3 | 0.9 | 1 | 1 | 1.8 |
| Mean burning time [sec] | 3) | 3) | 13 | 1 | 0 | 4 | 3 | 4 | 5 | 0 | 0 | 2 | 0 | 3 | 4 | 1 | 4 | 0 | 0 |
| Classification | 4) | 4) | V1 | V0 | V0 | V0 | V0 | V0 | V0 | V0 | V0 | V0 | V0 | V0 | V0 | V0 | V0 | V0 | V0 |

[1] Comparative test No. 1
[2] Comparative test No. 2
[3] Up to the top
[4] Insufficient

TABLE 2

| Example No. | Metal compound | Flame-resistance test UL 94 | | |
|---|---|---|---|---|
| | | Thickness [mm] | Burning time [sec] | Classification UL 94 |
| 18 | Copper phthalocyanine | 1.2 | 13 | V1 |
| 19 | Triphenyl antimony | 1.0 | 8 | V1 |
| 20 | Chrome(III) acetylacetonate | 1.1 | 18 | V1 |
| 21 | Manganese acetylacetonate | 1.3 | 13 | V1 |
| 22 | Methylcyclopentadienyl tricarbonyl manganese | 1.1 | 14 | V1 |

What is claimed is:

1. A resin mixture which may be cured to form a polymeric resin which is difficultly inflammable, said resin mixture comprising:
   (a) a resin component comprising at least one thermically curable 1-oxa-3-aza tetraline groups containing compound; and
   (b) a compound selected from the group consisting of:
      organic compounds of an element of the 6th auxiliary group of the periodic system;
      carbon monoxide complex compounds of an element of the 6th auxiliary group of the periodic system;
      organic compounds of an element of the 7th auxiliary group of the periodic system;
      carbon monoxide complex compounds of an element of the 7th auxiliary group of the periodic system;
      organic compounds of an element of the 8th auxiliary group of the periodic system;
      the carbon monoxide complex compounds of an element of the 8th auxiliary group of the periodic system;
      organic compounds of copper;
      carbon monoxide complex compounds of copper;
      organic compounds of antimony;
      carbon monoxide complex compounds of antimony;
      organic compounds of bismuth; and
      carbon monoxide complex compounds of bismuth.

2. A resin mixture according to claim 1, wherein said component (b) is an organic compound or a carbon-monoxide complex compound of an element selected from the group consisting of copper, manganese, chromium, iron and antimony.

3. A resin mixture according to claim 2, wherein said component (b) is an organic compound or a carbon-monoxide complex compound of iron.

4. A resin mixture according to claim 1, wherein said component (b) is a compound comprising bondings between said element and at least one carbon atom.

5. A resin mixture according to claim 4, wherein said at least one carbon atom is part of a compound selected from the group consisting of:
   alkyl compounds;
   aryl compounds;
   aralkyl compounds;
   alkenyl compounds;
   alkinyl compounds;
   enolates; and
   ethyl acetoacetate.

6. A resin mixture according to claim 2, wherein said component (b) is a compound comprising bondings between said element and at least one carbon atom.

7. A resin mixture according to claim 6, wherein said at least one carbon atom is part of a compound selected from the group consisting of:
   alkyl compounds;
   aryl compounds;
   aralkyl compounds;
   alkenyl compounds;
   alkinyl compounds;
   enolates; and
   ethyl acetoacetate.

8. A resin mixture according to claim 3, wherein said component (b) is a compound comprising bondings between iron and at least one carbon atom.

9. A resin mixture according to claim 7, wherein said at least one carbon atom is part of a compound selected from the group consisting of:
   alkyl compounds;
   aryl compounds;
   aralkyl compounds;
   alkenyl compounds;
   alkinyl compounds;
   enolates; and
   ethyl acetoacetate.

10. A resin mixture according to claim 1, wherein said component (b) is a compound comprising bondings between said element and at least one atom selected from the group consisting of nitrogen and phosphorus.

11. A resin mixture according to claim 10, wherein said component (b) is a phosphorus compound selected from the group consisting of porphins, porphyrins and phthalocyanines.

12. A resin mixture according to claim 2, wherein said component (b) is a compound comprising bondings between said element and at least one atom selected from the group consisting of nitrogen and phosphorus.

13. A resin mixture according to claim 12, wherein said component (b) is a phosphorus compound selected from the group consisting of porphins, porphyrins and phthalocyanines.

14. A resin mixture according to claim 3, wherein said component (b) is a compound comprising bondings between iron and at least one atom selected from the group consisting of nitrogen and phosphorus.

15. A resin mixture according to claim 14, wherein said component (b) is a phosphorus compound selected from the group consisting of porphins, porphyrins and phthalocyanines.

16. A resin mixture according to claim 1, wherein said component (b) is a complex compound of said element with a compound selected from the group consisting of cyclic conjugated polyenes and of polyenyl groups having non-localized electron pairs.

17. A resin mixture according to claim 2, wherein said component (b) is a complex compound of said element with a compound selected from the group consisting of cyclic conjugated polyenes and of polyenyl groups having non-localized electron pairs.

18. A resin mixture according to claim 3, wherein said component (b) is a complex compound of iron with a compound selected from the group consisting of cyclic conjugated polyenes and of polyenyl groups having non-localized electron pairs.

19. A resin mixture according to claim 16, wherein said component (b) is a complex compound of said element with a compound selected from the group consisting of:
cyclopentadienyl compounds;
cyclopentadienyl compounds having substituted cyclopentadienyl groups;
cyclopentadienyl compounds the cyclopentadienyl groups of which are partially replaced by other complex forming groups; and
cyclopentadienyl compounds the cyclopentadienyl groups of which are partially replaced by carbon monoxide.

20. A resin mixture according to claim 17, wherein said component (b) is a complex compound of said element with a compound selected from the group consisting of:
cyclopentadienyl compounds;
cyclopentadienyl compounds having substituted cyclopentadienyl groups;
cyclopentadienyl compounds the cyclopentadienyl groups of which are partially replaced by other complex forming groups; and
cyclopentadienyl compounds the cyclopentadienyl groups of which are partially replaced by carbon monoxide.

21. A resin mixture according to claim 18, wherein said component (b) is a complex compound of iron with a compound selected from the group consisting of:
cyclopentadienyl compounds;
cyclopentadienyl compounds having substituted cyclopentadienyl groups;
cyclopentadienyl compounds the cyclopentadienyl groups of which are partially replaced by other complex forming groups; and
cyclopentadienyl compounds the cyclopentadienyl groups of which are partially replaced by carbon monoxide.

22. A resin mixture according to claim 21, wherein said component (b) is ferrocene [bis(eta-cyclopentadienyl)iron].

23. A resin mixture according to claim 2, wherein the amount of said component (b) is from 0.1 to 20 percent by weight based on the resin content.

24. A resin mixture according to claim 23, wherein the amount of said component (b) is from 0.5 to 10 percent by weight based on the resin content.

25. A resin mixture according to claim 23, wherein the amount of said component (b) is less than 5 percent by weight based on the resin content.

26. A resin mixture according to claim 1, said resin mixture additionally comprising:
(c) a further resin component, the amount of said component (c) being less than 50 percent by weight based on the total resin content.

27. A resin mixture according to claim 26, wherein said component (c) is a resin selected from the group consisting of epoxy resins and phenol novolak resins.

28. A resin mixture according to claim 1, said resin mixture additionally comprising noncombustible reinforcing fibers.

29. A resin mixture according to claim 28, wherein said noncombustible reinforcing fibers are selected from the group consisting of:
glass fibers;
quartz fibers;
carbon fibers;
mineral synthetic fibers; and
difficultly combustible synthetic fibers.

30. A resin mixture according to claim 29, wherein said reinforcing fibers are in a form selected from the group consisting of:
short fibers;
staple fibers;
filaments;
threads;
fabrics;
cloths; and
non-wovens.

31. A resin mixture according to claim 28, wherein the amount of said reinforcing fibers is from 5 to 80 percent by weight based on the resin mixture.

32. A resin mixture according to claim 26, said resin mixture additionally comprising noncombustible reinforcing fibers.

33. A resin mixture according to claim 32, wherein said noncombustible reinforcing fibers are selected from the group consisting of:
glass fibers;
quartz fibers;
carbon fibers;
mineral synthetic fibers; and
difficultly combustible synthetic fibers.

34. A resin mixture according to claim 33, wherein said reinforcing fibers are in a form selected from the group consisting of:
short fibers;
staple fibers;
filaments;
threads;
fabrics;
cloths; and
non-wovens.

35. A resin mixture according to claim 32, wherein the amount of said reinforcing fibers is from 5 to 80 percent by weight based on the resin mixture.

36. A resin mixture according to claim 1, said resin mixture additionally comprising fillers.

37. A resin mixture according to claim 36, wherein said fillers are selected from the group consisting of:
magnesium hydroxide;
aluminium hydroxide [Al(OH)$_3$];
calcium carbonate;
magnesium carbonate;
barium carbonate;
calcium magnesium carbonate;
calcium barium carbonate;
magnesium barium carbonate;
calcium magnesium barium carbonate; and
mixtures of these compounds.

38. A resin mixture according to claim 36, wherein the amount of said fillers is from 5 to 80 percent by weight based on the resin mixture.

39. A resin mixture according to claim 38, wherein the amount of said fillers is from 10 to 60 percent by weight based on the resin mixture.

40. A resin mixture according to claim 38, wherein the amount of said fillers is less than 40 percent by weight based on the resin mixture.

41. A resin mixture according to claim 26, said resin mixture additionally comprising fillers.

42. A resin mixture according to claim 41, wherein said fillers are selected from the group consisting of:
magnesium hydroxide;
aluminium hydroxide [Al(OH)$_3$];
calcium carbonate;
magnesium carbonate;
barium carbonate;
calcium magnesium carbonate;
calcium barium carbonate;
magnesium barium carbonate;
calcium magnesium barium carbonate; and
mixtures of these compounds.

43. A resin mixture according to claim 41, wherein the amount of said fillers is from 5 to 80 percent by weight based on the resin mixture.

44. A resin mixture according to claim 43, wherein the amount of said fillers is from 10 to 60 percent by weight based on the resin mixture.

45. A resin mixture according to claim 43, wherein the amount of said fillers is less than 40 percent by weight based on the resin mixture.

46. A resin mixture according to claim 1, wherein said at least one thermically curable 1-oxa-3-aza tetraline groups containing compound is a compound such as obtainable by reacting phenol with an aromatic amine and formaldehyde.

47. A resin mixture according to claim 46, wherein said aromatic amine is selected from the group consisting of phenylenediamine and diaminodiphenylmethane.

48. A resin mixture according to claim 26, wherein said at least one thermically curable 1-oxa-3-aza tetraline groups containing compound is a compound such as obtainable by reacting phenol with an aromatic amine and formaldehyde.

49. A resin mixture according to claim 48, wherein said aromatic amine is selected from the group consisting of phenylenediamine and diaminodiphenylmethane.

50. A resin mixture according to claim 1, wherein said at least one thermically curable 1-oxa-3-aza tetraline groups containing compound is a compound such as obtainable by reacting a compound selected from the group consisting of dihydroxydiphenylmethanes, dihydroxybenzenes and novolaks with aniline and formaldehyde.

51. A resin mixture according to claim 26, wherein said at least one thermically curable 1-oxa-3-aza tetraline groups containing compound is a compound such as obtainable by reacting a compound selected from the group consisting of dihydroxydiphenylmethanes, dihydroxybenzenes and novolaks with aniline and formaldehyde.

52. A process for preparing polymeric resins which are difficultly inflammable, wherein a resin mixture according to claim 1 is cured.

53. A process according to claim 52, wherein said curing is effected at a temperature of 80° to 300° C.

54. A process according to claim 53, wherein said curing is effected at a temperature of 130° to 220° C.

55. A process for preparing polymeric resins which are difficultly inflammable, wherein a resin mixture according to claim 26 is cured.

56. A process according to claim 55, wherein said curing is effected at a temperature of 80° to 300° C.

57. A process according to claim 56, wherein said curing is effected at a temperature of 130° to 220° C.

58. A process according to claim 52, Wherein said component (a) prior to said curing is subjected to a prepolymerization to such an extent that viscosity is increased but the gel state is not yet reached.

59. A process according to claim 55, wherein said components (a) and (c) prior to said curing are subjected to a prepolymerization to such an extent that viscosity is increased but the gel state is not yet reached.

60. A process for manufacturing plastic products which are difficultly inflammable, wherein a material comprising a resin mixture according to claim 1 is shaped by a process selected from the group consisting of:
hot-pressing of prepregs;
hot-pressing of sheet molding compounds;
molding of compression-molding compounds;
injection molding of compression-molding compounds;
casting;
filament winding; and
vacuum impregnating; and is thereafter cured.

61. A process for manufacturing plastic products which are difficultly inflammable, wherein a material comprising a resin mixture according to claim 26 is shaped by a process selected from the group consisting of:
hot-pressing of prepregs;
hot-pressing of sheet molding compounds;
molding of compression-molding compounds;
injection molding of compression-molding compounds;
casting;
filament winding; and
vacuum impregnating;
and is thereafter cured.

62. A prepreg for use in the process according to claim 60, comprising a resin mixture according to claim 28.

63. A prepreg for use in the process according to claim 61, comprising a resin mixture according to claim 32.

64. A compression-molding compound for use in the process according to claim 60, comprising a resin mixture according to claim 36.

65. A compression-molding compound for use in the process according to claim 61, comprising a resin mixture according to claim 41.

* * * * *